United States Patent Office 3,304,702
Patented Feb. 21, 1967

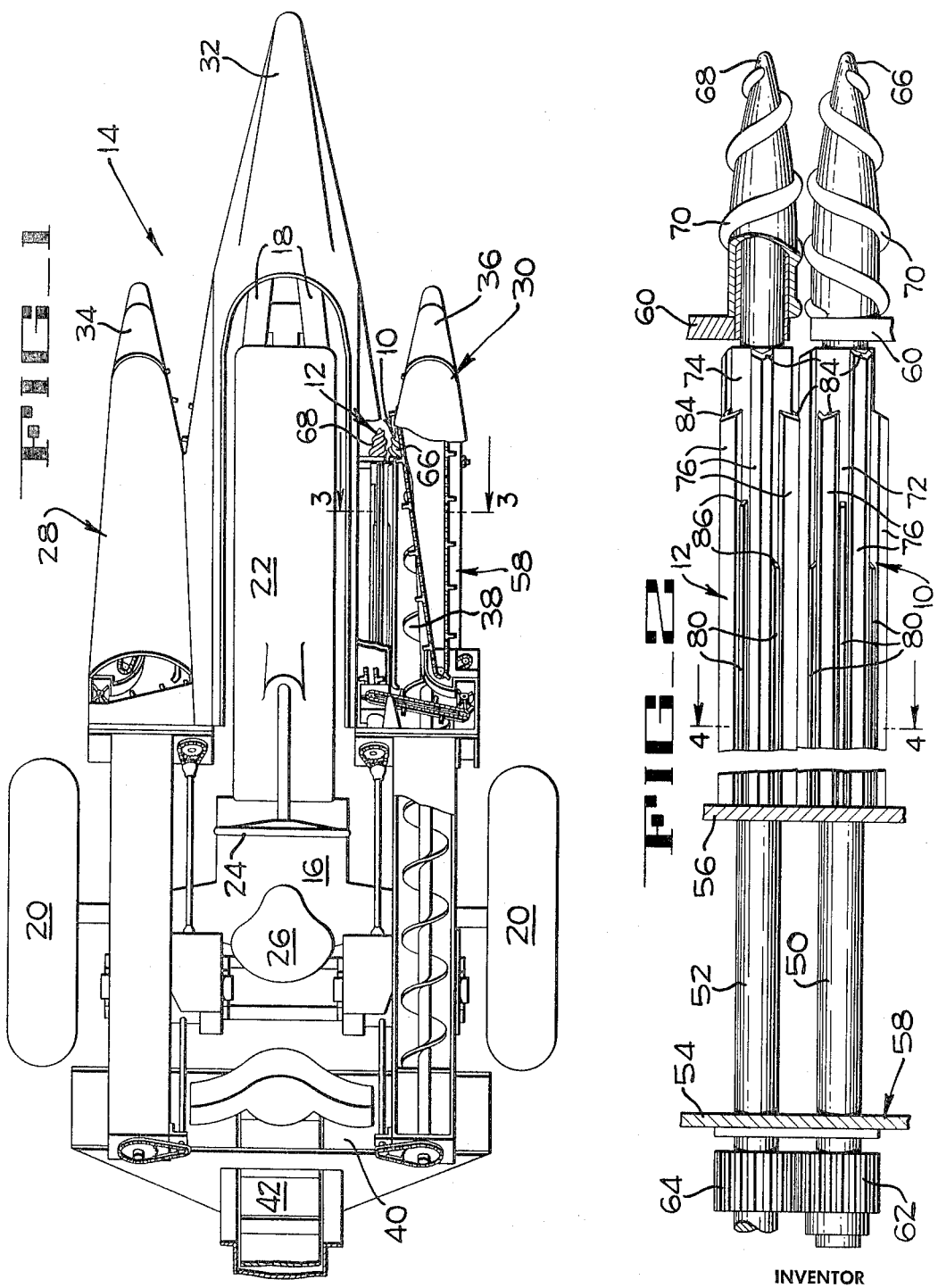

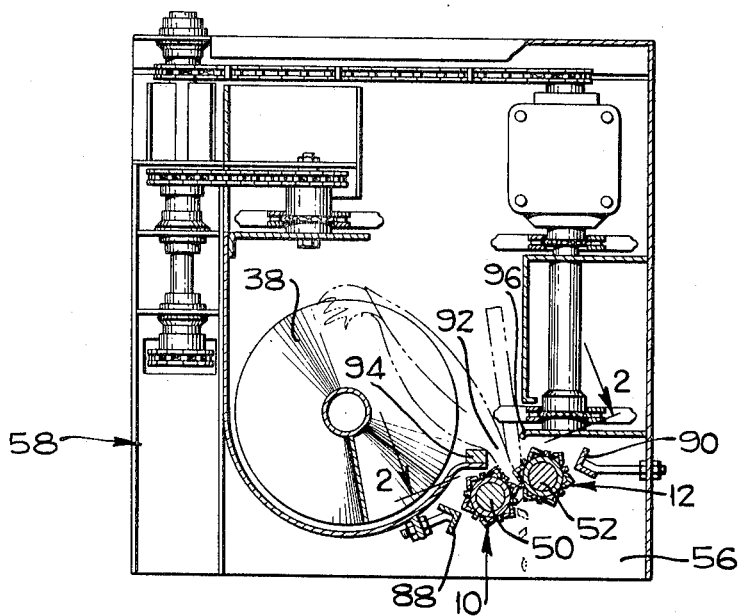
FIG_3
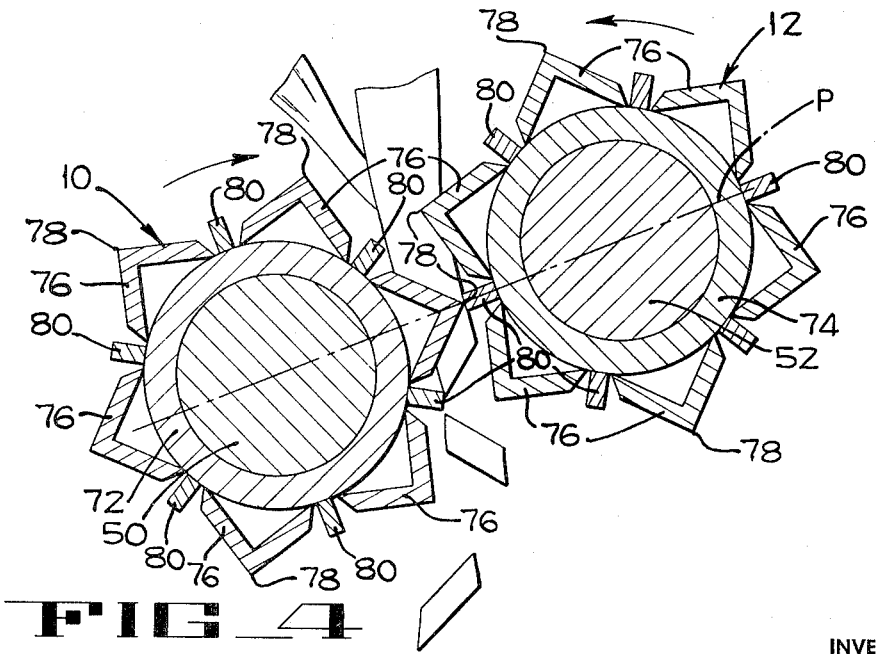
FIG_4
INVENTOR
DEAN E. RUSSELL
BY Hans G. Hoffmeister.
ATTORNEY

3,304,702
CUTTER ROLLS FOR CORN HARVESTERS
Dean E. Russell, Hoopeston, Ill., assignor to FMC Corporation, San Jose, Calif., a corporation of Delaware
Filed July 17, 1964, Ser. No. 383,277
7 Claims. (Cl. 56—104)

The present invention pertains to corn harvesters and more particularly relates to improvements in cutter rolls for corn harvesters.

Corn harvesters of the type disclosed in the United States Patent 2,676,450 which issued to Schaaf et al. on April 27, 1954, are provided with a pair of cooperating rolls which grip and pull the corn stalks as the harvester is driven through the field for the purpose of separating ears from the stalks. It has been determined that certain types of cutter rolls tend to cut the lower portions of each of the stalks from the upper portion before the upper portion has been suitably gripped by the rolls. It will be appreciated that, if the upper portion of the stalk is prematurely released from the rolls, the ears on the upper portion will not be severed from the stalk by the rolls, and the stalk is apt to fall lengthwise between the rolls to jam the rolls.

It is, therefore, one object of the present invention to provide cutter rolls for a corn harvester.

Another object is to provide cutter rolls with cutter bars thereon arranged to firmly grip the upper portion of the stalk prior to the time it severs, or substantially severs, lower portions therefrom.

Another object is to provide cutter rolls having cutter elements thereon arranged to insure reliable feeding of the stalks therebetween.

These and other objects and advantages of the present invention will become apparent from the following description and the accompanying drawings, in which:

FIGURE 1 is a top plan with parts broken away and other parts shown in sections of a corn harvester having cutter rolls constructed in accordance with the present invention.

FIGURE 2 is an enlarged section taken generally along the lines 2—2 of FIGURE 3, certain parts being broken away.

FIGURE 3 is an enlarged transverse section through a picker head taken substantially along lines 3—3 of FIGURE 1.

FIGURE 4 is an enlarged transverse section taken along lines 4—4 of FIGURE 2.

The improved cutter rolls 10 and 12 (FIGS. 1 and 2) of the present invention may be used in the corn harvester 14 disclosed in the aforementioned Schaaf et al. patent in place of the rolls described therein. Accordingly, the harvester with which the rolls 10 and 12 of the present invention is used, will only briefly be described. If a more detailed description of any portion of the harvester is desired, reference may be had to the aforementioned Schaaf et al. patent.

The corn harvester 14 is mounted on a tractor 16 having front steerable wheels 18 and rear driven wheels 20. The tractor and other harvester components are powered by an engine 22, and the tractor is adapted to be driven between two rows of corn by an operator who steers the tractor by means of a steering wheel 24 while sitting on a seat 26.

Two identical picker heads 28 and 30 are provided in order to harvest two rows of corn simultaneously. The corn is guided into the two picker heads by a snout 32 mounted on the forward end of the tractor and movable between the two rows, and by shorter side snouts 34 and 36 mounted on the forward ends of the picker heads 28 and 30, respectively. Since the picker heads 28 and 30 include identical, complementary components, the description of the construction and operation of the head 30 will suffice for both.

As the harvester 14 is driven between the rows of corn, the corn stalks of one row are guided between the cutter rolls 10 and 12 by the associated snouts and are maintained in an upright position by means not shown. The cutter rolls are inclined with their forward end lowermost so as to initially engage corn stalks near the lower ends thereof. With the stalks gripped and fed downwardly between the rolls 10 and 12, the ears of corn are separated forcibly one at a time from the stalk and are deflected into a screw conveyor 38 which moves the ears upwardly and toward the rear of the tractor before discharging them into a chute 40 that directs the ears to the lower end of an elevator 42. The elevator 42 discharges the ears from the harvester into any suitable collecting means (not shown) such as a truck or the like.

The cutting rolls 10 and 12 (FIGS. 2, 3, and 4) of the present invention includes parallel shafts 50 and 52 journalled in suitable bearings in transfer walls 54 and 56 of the frame 58 of the picker head 30, and also in brackets 60 connected to the frame 58. The shaft 52 is disposed in a slightly higher horizontal plane than the shaft 50, as clearly illustrated in FIG. 3, so as to deflect the ears towards the screw conveyor 38. Meshing pinions 62 and 64 are keyed to the upper ends of the shafts 50 and 52, respectively, and drive the shafts at approximately 800 to 900 r.p.m. in the direction indicated by the arrows in FIG. 4, which direction will cause the adjacent surfaces of the rolls 10 and 12 to move downwardly.

Generally conical noses 66 and 68 having spiral flights 70 thereon are rigidly secured, as by pinning, to the lower ends of the shafts 50 and 52, respectively, and the flights 70 cooperate to feed the corn stalks between the rolls 10 and 12.

Elongated tubes 72 and 74 are rigidly secured to the shafts 50 and 52, respectively, and each tube has a plurality of evenly spaced, elongated angle cutter bars 76 secured thereto and extending in a direction parallel to the axis of rotation of the tube. The cutting edge 78 of each angle bar 76 is defined by surfaces disposed at 90° from each other. A plurality of elongated, equally spaced pressure resisting bars 80 are secured to the tubes 72 and 74 and are disposed between the angle bars 76. The pressure resisting bars 80 project outwardly from the periphery of the tubes 72 and 74 approximately half as far as do the cutting edges 78. As clearly shown in FIGURE 4, the timing of the cutter rolls 10 and 12 is such that the edges 78 of the cutter bars 76 are disposed opposite the ends of the pressure resisting bars 80 when the edges 78 of each cutter and its associated bar 80 lie in a cutting plane P, which plane P has the axes of the shafts 50 and 52 and of the tubes 72 and 74 therein.

In order to more reliably feed the stalks between the two cutter rolls 10 and 12, the lower ends 84 (FIG. 2) of the angle bars 76, and the lower ends 86 of the pressure resisting bars 80 are staggered. As shown in FIG. 2, the lower ends 84 of the angle bars 76, and the lower ends 86 of the pressure resisting bars 80 are beveled approximately 30° rearwardly relative to the longitudinal axes of the associated cutter rolls 10 and 12. It will also be noted that alternate ones of the angle bars 76 extend to the lower ends of the associated tubes 72 and 74, and that the angle bars disposed therebetween have their lower ends spaced approximately 3 inches upwardly from the lower ends of the tubes. Similarly, alternate ones of the pressure resisting bars 80 have their lower ends 86 spaced approximately 5 inches from the lower ends of the associated tubes 72 and 74, while the other pressure resisting bars 80 have their lower ends spaced approximately 7 inches from the lower ends of the tubes.

In the event weeds or fragments of corn stalk should cling to the cutter rolls 10 and 12, scraper bars 88 and 90 (FIG. 3) are rigidly secured to the frame 58 at points immediately adjacent the peripheries of the cutter rolls 10 and 12, respectively. As the corn stalks pass between the cutter rolls, they also pass through a narrow slot 92 defined by a bar 94 and the curved end of a plate 96 that is secured to the frame 58. The edges of the narrow slot engage the relatively large diameter portion of each ear of corn and resists downward movement of the ear so that the stem of the corn is placed in tension and is more easily separated from the stalk.

In the operation of the cutter rolls 10 and 12 of the present invention, the harvester 14 is driven through the corn field causing stalks of corn to move between the conical noses 66 and 68 of the rolls. The flights 70 on the noses drive the stalks rearwardly relative to the rolls 10 and 12 at subsantially the same speed as the forward movement of the harvester 14. The lower end portion of each stalk is then moved between the rolls 10 and 12, upon continued forward movement of the harvester, aided by the fact that alternate ones of the angle cutter bars 76 do not extend to the lower ends of the tubes 72 and 74 and by the fact that the angle cutter bars 76 do not oppose pressure resisting bars 80 until the stalks have been moved beyond the lower ends of all the cutter bars.

Continued movement of the harvester 14 through the field will cause the stalks to move between the angle cutter bars 76 and the associated pressure resisting bars 80 to thereby cut the stalks into pieces, as indicated in FIGURE 4, as the bars 76 and 80 move past the cutting plane. It will be noted that before a pair of bars 76 and 80 moves through the cutting plane P, the next adjacent cooperating pair of bars 76 and 80 disposed above the cutting plane P have firmly gripped the stalk, and accordingly, will not permit the stalk to fall lengthwise between the rolls 10 and 12. In this way, the stalk is pulled down until an ear of corn approaches the cutter rolls and is held from further downward movement by engagement with the bar 94 and plate 96. The stem which connects the ear to the stalk is thus placed in tension and is separated from the stalk by being pinched between a cutter bar 76 and a cooperating pressure resisting bar 80.

Each ear is severed from the stalk in the same manner and falls into the screw conveyor for subsequent discharge from the harvester 14.

From the foregoing description it is apparent that the cutter rolls of the present invention are arranged to assure that corn stalks are first properly fed therebetween, and that the stalks are thereafter pulled between the rolls in such a way as to maintain a firm grip on the stalks before cutting the lower portions of the stalks into small pieces.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. In a corn harvester, the combination of a first driven cutter roll, a second driven cutter roll positioned parallel to and closely adjacent said first roll, a plurality of evenly spaced cutter bars secured to each roll and each bar having a blunt cutting edge defined by surfaces disposed at an angle of at least 90° to each other, a pressure resisting bar on each roll disposed between each adjacent pair of cutter bars on the roll, and drive means interconnecting said first and said second rolls for rotating said rolls in timed relation so that a cutter bar on one of said rolls will oppose and be positioned immediately adjacent to a pressure resisting bar on the other roll when moving through a cutting plane, said pressure resisting bars each being rectangular in cross section.

2. In a corn harvester, the combination of means defining a pair of continuously driven cutter rolls disposed in close proximity to each other and having their adjacent surfaces moving in the same direction, a plurality of equally spaced cutter bars on each roll and movable past a cutting plane intersecting the axes of the rolls, each cutting bar having a blunt cutting edge defined by surfaces disposed at an angle of at least 90° relative to each other, and a plurality of pressure resisting bars on each roll, one pressure resisting bar being disposed between each pair of adjacent cutter bars and positioned immediately adjacent and opposed to one of the cutter bars on the other roll as said cutter bar and said pressure resisting bar pass through the cutting plane, the cooperating cutter bar and pressure resisting bar approaching said cutting plane being in firm gripping engagement with said stalk prior to the stalk being severed by the bars at said cutting plane, said pressure resisting bars each being rectangular in cross section.

3. In a corn harvester, the combination of a first continuously driven cutter roll, a second continuously driven cutter roll positioned parallel to and closely adjacent said first roll, a plurality of evenly spaced cutter bars secured to each roll, alternate ones of said cutter bars on each roll being foreshortened at one end to aid in feeding corn stalks between said rolls, a pressure resisting bar disposed between each pair of adjacent cutter bars and secured to the associated roll, and drive means interconnecting said first and second rolls for rotating said rolls in timed relation so that a cutter bar on one of said rolls will oppose and be positioned immediately adjacent to a pressure resisting bar on the other roll when moving through a cutting plane.

4. In a corn harvester, the combination of a first driven cutter roll, a second driven cutter roll positioned parallel to and closely adjacent to said first roll, a plurality of evenly spaced cutter bars secured to each roll, a first end of each cutter bar being beveled and alternate ones of said cutter bars on each roll being foreshortened to aid in feeding corn stalks between said rolls, a plurality of pressure resisting bars secured to each roll with one pressure resisting bar being disposed between each adjacent cutter bar, and drive means interconnecting said first and second rolls for rotating said rolls in timed relation so that the cutter bar on one of said rolls will oppose and be positioned immediately adjacent to a pressure resisting bar on the other roll when moving through a cutting plane.

5. In a corn harvester, the combination of a first continuously driven cutter roll, a second continuously driven cutter roll positioned parallel to and closely adjacent said first roll, a plurality of evenly spaced cutter bars secured to each roll, alternate ones of said cutter bars being foreshortened at said one end to aid in feeding corn stalks between said rolls, a pressure resisting bar disposed between each cutter bar and secured to the associated roll, alternate ones of said pressure resisting bars being foreshortened relative to the other pressure resisting bars and relative to the cutter bars at the end adjacent said foreshortened cutter bars to aid in feeding corn stalks between said rolls and drive means interconnecting said first and second rolls so that a cutter bar on one of said rolls will oppose and be positioned immediately adjacent to a pressure resisting bar on the other roll when moving through a cutting plane.

6. In a corn harvester, the combination of a first continuously driven cutter roll, a second cutter roll disposed parallel to and closely adjacent said first roll, means drivingly connecting said first roll to said second roll whereby adjacent surfaces of the rolls move downwardly past the cutting plane, a plurality of evenly spaced cutter bars of rectangular cross section secured to each roll, each cutting bar having a blunt cutting edge defined by surfaces disposed at an angle of at least 90° to each other, and a pressure resisting bar of rectangular cross section disposed between each cutter bar and secured to the associated roll, said cutting edge of each of said cutter bars on one roll being positioned opposite a pressure resisting bar on the other roll as said bars pass through a cutting plane and cut through a corn stalk disposed therebetween, the cutter bar and cooperating pressure resisting bar next approaching said cutting plane being in firm gripping engagement with the stalk prior to the stalk being severed by the cutter bar and pressure resisting bar at said cutting plane.

7. In a corn harvester, the combination of a first continuously driven cutter roll having a cylindrical base, a second cutter roll disposed parallel to and closely adjacent said first roll and having a base equal in diameter to said first base, means drivingly connecting said first roll to said second roll whereby adjacent surfaces of the rolls move downwardly past a cutting plane, a plurality of evenly spaced cutter bars secured to the outer periphery of the base of each roll, and a pressure resisting bar disposed between each cutter bar and secured to the associated roll, said cutter bars projecting outwardly of the cylindrical base of the associated roll a distance substantially twice that of said pressure resisting bars, each cutter bar on one roll being positioned opposite a pressure resisting bar on the other roll as said bars pass through a cutting plane and cut through a corn stalk disposed therebetween, the cutter bar and cooperating pressure resisting bar next approaching said cutting plane being in firm gripping engagement with the stalk prior to the stalk being severed by the cutter bar and pressure resisting bar positioned at said cutting plane.

References Cited by the Examiner
UNITED STATES PATENTS

| | | | |
|---|---|---|---|
| 2,604,750 | 7/1952 | Fergason | 56—104 |
| 2,676,450 | 4/1954 | Schaaf et al. | 56—66 |
| 2,716,321 | 8/1955 | Schaaf et al. | 56—104 |
| 2,870,593 | 1/1959 | Anderson | 56—104 |

ABRAHAM G. STONE, *Primary Examiner.*
ANTONIO F. GUIDA, *Examiner.*